June 25, 1963

M. T. STEVENS 3,095,232

WALK-THROUGH SEAT

Filed Jan. 9, 1961

INVENTOR.
MYRON T. STEVENS
BY
Wheeler, Wheeler & Wheeler
ATTORNEYS.

United States Patent Office 3,095,232
Patented June 25, 1963

3,095,232
WALK-THROUGH SEAT
Myron T. Stevens, Kenosha, Wis., assignor to Outboard Marine Corporation, Waukegan, Ill., a corporation of Delaware
Filed Jan. 9, 1961, Ser. No. 81,431
5 Claims. (Cl. 296—65)

This invention relates to a walk-through seat structure.

In boats and other vehicles having rows of seats it is common to omit one or more seats of a given row to provide a passage. The present invention contemplates the provision of a seat which makes the row of seats normally continuous, but provides for passage when a given seat is moved pivotally upon its mounting to a remote position of storage.

The movable seat is mounted in part upon a bracket which is pivoted to the floor well forwardly of the normal position of seat use, and which has upstanding leg portions to which the seat is pivoted. The leg portions of this bracket normally support the forward edge of the seat when the seat is in a position of use, the back of the seat having an independent support which may comprise a leg or legs.

When the seat is to be stored to open the walk-through passage, the back folds down upon the seat and the compact back and seat assembly is moved bodily forwardly about the floor-connected pivot of the bracket, the assembly also moving pivotally about the connection between the seat and the bracket, the alternate position of storage being well forward as, for example, beneath a forward deck of the boat or vehicle.

Figure 1:
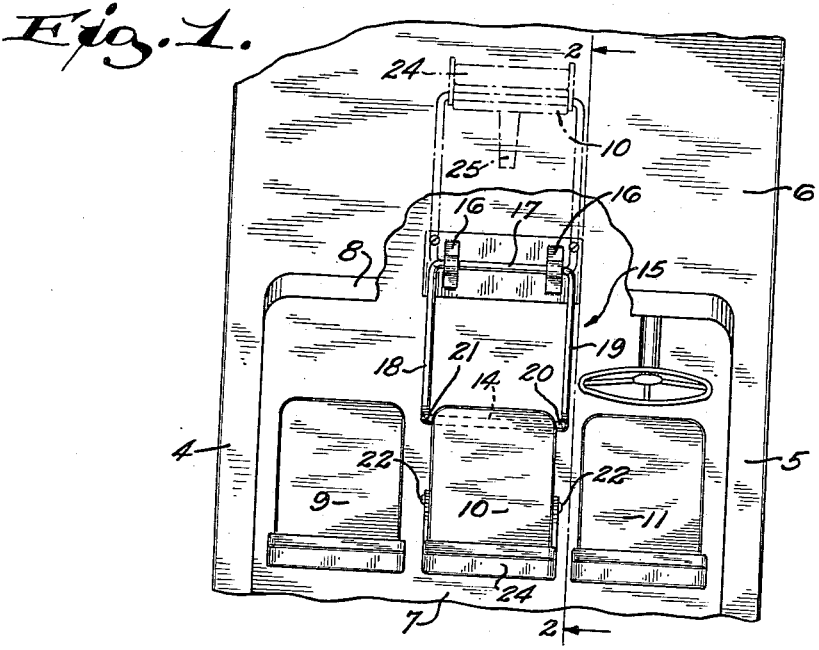
FIG. 1 is a fragmentary plan view of a vehicle having a forward deck and a row of seats.

The vehicle selected for exemplification of the invention is a boat, portions of the coaming being shown at 4 and 5, portions of the deck being shown at 6, portions of the floor being shown at 7 and the instrument panel being shown at 8.

Spaced aft of the instrument panel there is a row of seats 9, 10 and 11. A cavity is provided at 12 beneath the deck 6 for the feet of passengers using the seats.

The movable seat 10 is pivotally mounted upon a transverse bar 14 which is a part of a bracket generically designated by reference character 15. This bracket is hinged to the floor 7 in any desired manner, straps 16 being shown for this purpose. The straps embrace a horizontal bar 17 which lies beneath or forwardly of the instrument panel 8. The laterally spaced bars 18, 19 extend fore and aft to provide connection between the transverse floor-pivoted bar 17 of the bracket and the upright leg portions 20 and 21 of the bracket, which connect the transverse bar 17 with the transverse bar 14 upon which the forward part of seat 10 is pivoted.

The studs 22 at opposite sides of seat 10 pivotally support the seat back 24.

Figure 2:
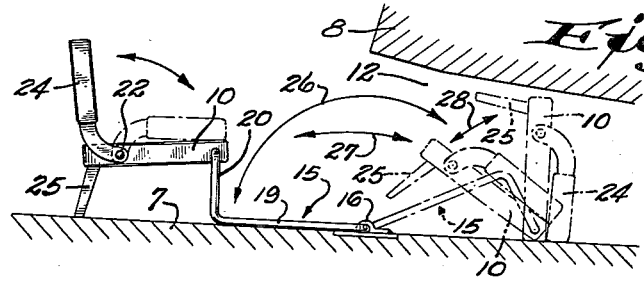
FIG. 2 is a view of the movable seat as viewed from the line 2—2 of FIG. 1, portions of the floor and deck structure being shown in section.
Figure 3:
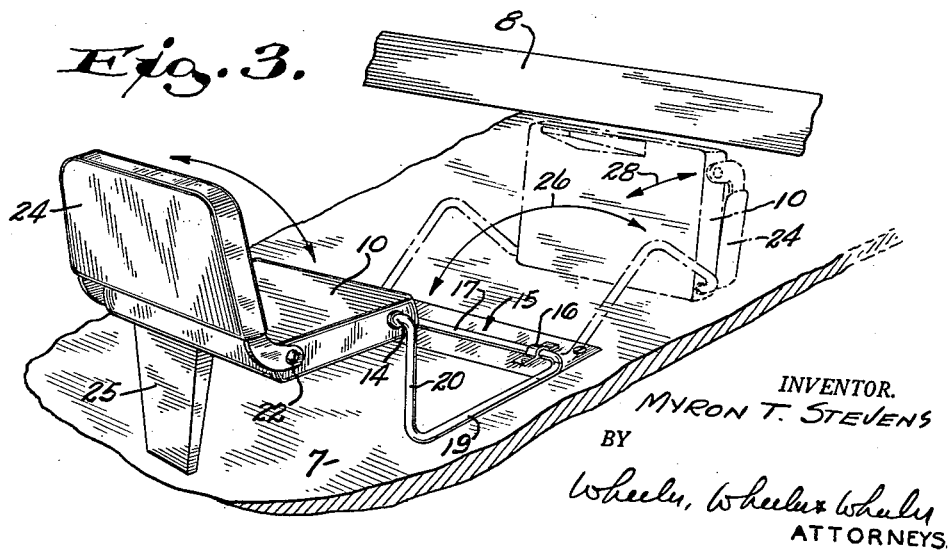
FIG. 3 is a view in perspective showing in full lines the movable seat in position of use and showing in dotted lines the stored position of the movable seat, a portion of the instrument panel being fragmentarily illustrated.

When the seat is in the position of use shown in full lines in FIGS. 2 and 3, the rear of the seat is carried by the leg support 25 while the forward margin of the seat is pivotally carried from the leg portions 20, 21 by the transverse bar portion 14 of bracket 15. When it is desired to open a passageway between the seats 9 and 11, the back 24 is folded down upon the seat 10 as shown in dotted lines in FIG. 2 and thereupon the entire seat is swung upwardly on bracket 15 about the pivotal connection of the bracket to the floor as provided by the rotation of bar 17 in straps 16. The movement of the bracket is indicated by the arcuate double-headed arrow 26. The movement of the seat is indicated by the double-headed arrow 27. When the bracket has moved to the position shown in dotted lines in FIG. 2 and FIG 3, the seat may be pivoted farther forward as indicated by the double-headed arrow 28 so that the seat 10 is now disposed on end as shown in dotted lines at the right in FIG. 2 and FIG. 3.

In this position of the parts, both the seat and the bracket are completely under the deck 6, whereby the aisle transversely of the vehicle in front of the seats 9 and 11 is clear, as well as the walk-through aisle between seats 9 and 11.

By simply grasping the rear leg means 25 or any other portion of the walk-through seat assembly, the user can withdraw the seat by a converse operation such that the seat and back assembly is first pivoted from upright stored position to the inclined position shown in FIG. 2, the entire bracket 15 being thereupon pivoted aft as indicated by the arrow 26, the seat 10 being thereupon fixed in the position shown in full lines in FIGS. 2 and 3.

I claim:

1. A walk-through seat movable between a stored position and a position of use and comprising the combination with a seat, of means for supporting the seat in the position of use of the seat including a unitary rigidly extending bracket having generally upright leg portions to the upper ends of which the seat is pivoted, floor-pivoted portions remote from the leg portions, generally horizontal connecting portions between the lower ends of the leg portions and the floor-pivoted portions, and a pair of transverse bars, one of which constitutes the floor-pivoted portions of the bracket and which is provided with bearing means for fixing its axis of pivotal movement, the other of said bars being at the top of said leg portions and the seat having a bearing portion engaged thereon, the said connecting portions being disposed fore and aft and extending to the ends of the bar constituting the floor-connected portion of the bracket.

2. The device of claim 1 wherein said means for supporting the seat in the position of use of the seat includes means at the rear of the seat, the forward portion thereof being supported by said leg portions.

3. In a vehicle having a forward storage space and a floor opening into said space, a row of seats aft of said space, said floor including seat-access space extending transversely of the vehicle in front of the row of seats, means for supporting the seat in the position of use including a unitary rigidly extending bracket having means pivotally attaching it with the floor forwardly of the access space and at the opening into said storage space, the bracket including connecting means extending aft at floor level across the access space from said pivotal attaching means and leg means extending upwardly from the connecting means and in pivotal supporting relation to the front of one of said seats, the bracket and the seat in pivotal connection therewith being bodily swingable about said pivotal attaching means to move the seat into said storage space, the seat being pivotally movable respecting said leg means in the course of such movement of the bracket.

4. The device of claim 3 wherein said seat supporting means includes independent leg means supporting its aft portion when the forward portion of the seat is supported by said leg means.

5. A walk-through seat movable between a stored position and a position of use and comprising the combination with a seat, of a unitary rigidly extending bracket having generally upright leg portions, means providing a pivotal connection between said leg portions and one margin of the seat, means providing a floor pivotal connection parallel to said first pivotal connection and remote from the bracket leg portions in a direction away from the seat when the seat is in its said position of use, said bracket including generally horizontal portions connecting the lower ends of the leg portions with said means providing a floor pivotal connection, and means independent of said bracket and wholly at the other side of the seat therefrom for supporting the seat in said position of use.

References Cited in the file of this patent

UNITED STATES PATENTS

| | | |
|---|---|---|
| 1,397,594 | Moses | Nov. 22, 1921 |
| 1,593,477 | Speyer | July 20, 1926 |
| 1,640,640 | Boargon | Aug. 30, 1927 |

FOREIGN PATENTS

| | | |
|---|---|---|
| 195,207 | Great Britain | Mar. 29, 1923 |
| 389,657 | France | July 6, 1908 |
| 428,435 | France | Aug. 30, 1911 |
| 504,723 | France | Apr. 20, 1920 |
| 538,545 | France | Mar. 20, 1922 |
| 1,151,278 | France | Aug. 19, 1957 |